United States Patent [19]
Kuribayashi

[11] Patent Number: 5,267,903
[45] Date of Patent: Dec. 7, 1993

[54] SHAFT COUPLING

[75] Inventor: Sadatomo Kuribayashi, Tokyo, Japan

[73] Assignee: Kay Seven Co., Ltd., Tokyo, Japan

[21] Appl. No.: 859,405

[22] PCT Filed: May 8, 1991

[86] PCT No.: PCT/JP91/00612
§ 371 Date: May 27, 1992
§ 102(e) Date: May 27, 1992

[87] PCT Pub. No.: WO92/06311
PCT Pub. Date: Apr. 16, 1992

[30] Foreign Application Priority Data

Oct. 3, 1990 [JP] Japan ................... 2-263772
Feb. 22, 1991 [JP] Japan ................... 3-48607
Mar. 6, 1991 [JP] Japan ................... 3-63731
Mar. 12, 1991 [JP] Japan ................... 3-70356

[51] Int. Cl.⁵ .............................................. F16D 3/04
[52] U.S. Cl. ..................................... 464/104; 464/147
[58] Field of Search ............... 464/102, 104, 147, 17

[56] References Cited
U.S. PATENT DOCUMENTS

| Re. 27,068 | 2/1971 | Groves et al. | 464/102 |
| 1,182,904 | 5/1916 | Hamilton et al. | 464/104 |
| 1,182,905 | 5/1916 | Hamilton et al. | 464/104 |
| 1,948,708 | 2/1934 | Grundy | 464/102 |
| 2,011,147 | 8/1935 | Haselau | 464/104 |
| 2,076,752 | 4/1937 | Thomas | 464/102 |
| 2,417,436 | 3/1947 | Natkins | 464/17 |
| 2,892,328 | 6/1959 | Templeton | 464/104 X |
| 4,464,142 | 8/1984 | Bridges et al. | 464/104 X |
| 4,889,518 | 12/1989 | Komata | 464/102 |

FOREIGN PATENT DOCUMENTS

| 226901 | 10/1910 | Fed. Rep. of Germany | 464/104 |
| 907004 | 3/1954 | Fed. Rep. of Germany | 464/104 |
| 2461152 | 3/1981 | France | 464/102 |
| 24-286 | 6/1949 | Japan . | |
| 48-14980 | 4/1973 | Japan . | |
| 57-114032 | 7/1982 | Japan . | |
| 75133 | 4/1987 | Japan | 464/102 |
| 62-176521 | 11/1987 | Japan . | |
| 62-176522 | 11/1987 | Japan . | |
| 2141520 | 12/1984 | United Kingdom | 464/102 |

Primary Examiner—Clifford D. Crowder
Assistant Examiner—John J. Calvert
Attorney, Agent, or Firm—Kane, Dalsimer, Sullivan, Kurucz, Levy, Eisele and Richard

[57] ABSTRACT

A shaft coupling includes a plurality of first channels (10) which runs in a first direction formed at a flange portion (3) at the end portion of a driving shaft and a plurality of second channels (12) which run in a second direction perpendicular to the first direction formed at a flange portion (5) at the end portion of a driven shaft. A torque transmitting member (14) is interposed between the flange portion (3) and the flange portion (5). A plurality of first slide members (16) which each slidably fit with the first channels are formed on the transmitting member (14), and a plurality of second slide members (18) which each slidably fit with the second channels are formed thereon. The transmitting member (14) is made of plastic material, and the flange portions (3) and (5) are made of metal. According to this shaft coupling, the eccentricity, deviation of angle and axial movement between the driving shaft side and the driven shaft side can be effectively undertaken and a great torque can be thereby smoothly transmitted with a small loss.

4 Claims, 13 Drawing Sheets

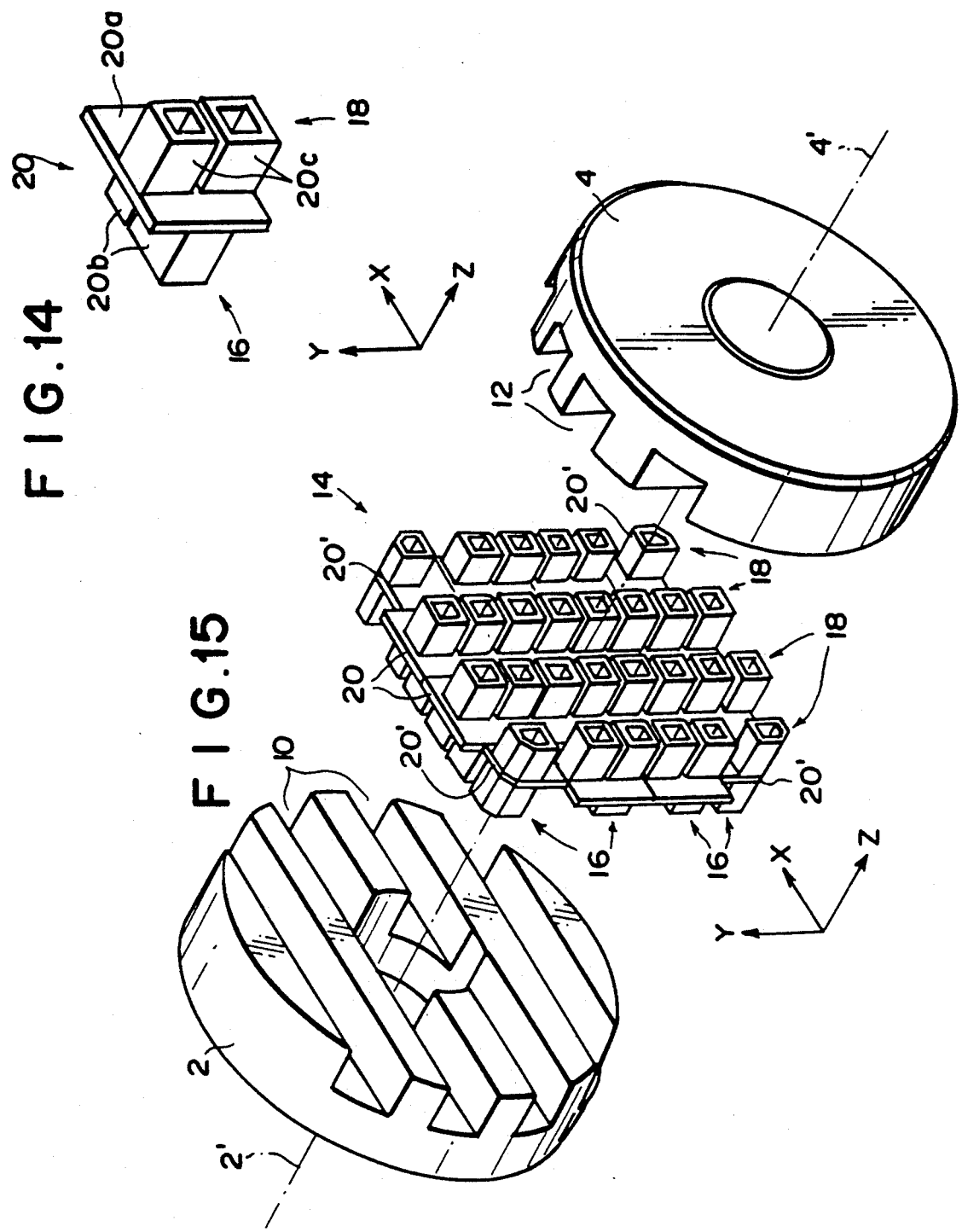

SHAFT COUPLING

TECHNICAL FIELD

The present invention relates to a shaft coupling which excellently copes with eccentricity, deviation of angle and axial movement between a driving shaft and a driven shaft so that a large torque is smoothly transmitted with a small loss and allows its maintenance to be simplified.

TECHNICAL BACKGROUND

In various mechanisms for transmitting a rotational torque, the end portions of two rotating shafts are coupled by means of a coupling. For example, an output rotating shaft of a motor and an input rotating shaft of a pump are coupled to each other by means of the coupling. In this case, it takes a considerable amount of labor to carefully install the motor and the pump so that the output shaft of the motor and the input shaft of the pump may satisfactorily align. In addition, even if they are installed by paying a full attention to assuring such an alignment, some eccentricity or deviation of angle remains between both the shafts and, further, since vibrations occur in the motor and the pump during the operation, a flexible coupling has conventionally been used as the coupling in order to absorb them by the coupling portion. As the conventional coupling, ones using a flexible member such as a spring, wire or the like may be enumerated by way of example. However, with those flexible couplings, when the eccentricity, deviation of angle and axial movement occur, since the absorption of a relative displacement between the two rotating shafts is assigned only to a deformation of the flexible member, in order to enlarge an extent to which the eccentricity, deviation of angle and axial movement are allowed, the deformation of the flexible member must be large. In consequence, a soft member must be used as the flexible member and, especially when a large torque is transmitted, the torque cannot excellently be transmitted during a transition period when an equilibrium state is being changed. In addition, a considerable amount of energy is consumed to deform the flexible member, and an efficiency of transmitting the torque is lowered.

In addition, an Oldham coupling has been used as a coupling which copes with the above-described eccentricity, deviation of angle and axial movement. However, for a conventionally used Oldham coupling, a member for transmitting the torque is disposed between a member at the side of the driving shaft and a member at the side of the driven shaft so that the torque transmitting member and the member at the side of the driving shaft may relatively slide in a first direction within a plane intersecting at a right angle with the rotational axis while the torque transmitting member and the member at the side of the driven shaft may slide in a second direction intersecting at a right angle with the above-described first direction and being within a plane intersecting at a right angle with the rotational axis, these slidings being each achieved by engaging a single slide member within a single channel. As a result, the conventional Oldham coupling has been used as one in which the area of the slide portion for transmitting the torque is small and a relatively small torque is to be transmitted. Further, for the conventionally used Oldham coupling, since the above-described channel and the slide member are each made of metal, it is necessary to arrange so that a lubricating oil exists therebetween, which in turn causes a troublesome maintenance. In addition, with the conventional Oldham coupling, when the equilibrium state is abruptly changed as when a load is abruptly changed, an excessive stress has been applied thereto and, further, the vibration is easy to be transmitted between the driving shaft side and the driven shaft side. In order to overcome such drawbacks, the Oldham coupling and the above-described flexible coupling have often been used by connecting, which, however, undesirably causes enlargement of the size as well as increase of the cost.

DISCLOSURE OF THE INVENTION

Accordingly, an object of the present invention is to provide a shaft coupling which may excellently cope with the eccentricity, deviation of angle and axial movement between the driving shaft side and the driven shaft side so that a large torque may be smoothly transmitted with a small loss and may simplify its maintenance.

According to the present invention, there is provided a shaft coupling in which:

the end portion of the driving shaft and the end portion of the driven shaft are oppositely disposed and a member for transmitting a torque is interposed therebetween;

at the end portion of the above-described driving shaft, a first channel or a first slide member is formed in plural number in a first direction within a plane intersecting at a right angle with the rotational axis of the driving shaft and, at the above-described torque transmitting member, a first slide member or a first channel is formed in plural number so that they may be each slidably fitted to the above-described first channel or first slide member;

at the end portion of the driven shaft, a second channel or a second slide member is formed in plural number in a second direction within a plane intersecting at a right angle with the rotational axis of the driven shaft while, at the member for transmitting the torque, a second slide member or a second channel is formed in plural number so that they may be each slidably fitted to the second channel or second slide member;

either ones of the lateral surface of the first slide member or the first channel and the lateral surface of the second slide member or the second channel for the torque transmitting member, and the lateral surface of the first channel or the first slide member for the end portion of the driving shaft and the lateral surface of the second channel or the second slide member for the end portion of the driven shaft are made of plastic material and the others are made of metal.

According to the present invention, there is an embodiment in which the above-described torque transmitting member is integrally formed of plastic material.

According to the present invention, there is also an embodiment in which at least one of the end portions of the driving shaft and the driven shaft includes an engage- and removable fitting member having the first slide members of the first channels, or the second slide members or the second channels wherein the fitting member for the end portion of the driving shaft is mounted to the proximal portion of the end portion of the driving shaft so that, when removed, it may be relatively moved in the first direction relative to the proximal end portion of the driving shaft while the fitting member for the end portion of the driven shaft is mounted to the proximal portion of the end portion of the driven shaft so that, when removed, it may be relatively moved in the second direction relative to the proximal portion of the end portion of the driven shaft. In addition, there is also an embodiment in which, at each of the above-described end portion of the driving shaft and the end portion of the driven shaft, a means for preventing a relative rotation of the fitting member and the proximal portion about the rotational axis is provided.

According to the present invention, there is also an embodiment in which, for the above-described torque transmitting member, on both surfaces of its reinforcing plate, the first slide member or the first channel and the second slide member or the second channel each made of plastic material are formed so that these plastic material portions on both sides are continuous via a notch portion and/or an aperture portion of the reinforcing plate.

According to the present invention, there is also an embodiment in which, for the torque transmitting member, at least the lateral surface of the first slide member or the first channel and the lateral surface of the second slide member or the second channel of the metallic base member are coated with plastic material.

According to the present invention, there is also an embodiment in which, for the end portion of the driving shaft and the end portion of the driven shaft, at least the lateral surface of the first channel or the first slide member and the lateral surface of the second channel or the second slide member of the metallic base member are coated with plastic material.

According to the present invention, there is also an embodiment in which the torque transmitting member is divided into the even number portions more than four by radially running diving lines so that each of those portions has at least one first slide member or first channel and at least one second slide member or second channel. Here, there is an embodiment in which the above-described first and second directions intersect at a right angle with each other and the torque transmitting member is divided into four portions so that the directions in which the dividing lines run each deviate by an angle of 45 degrees relative to the first and second directions.

According to the present invention, there is also an embodiment in which the torque transmitting member comprises a plurality of elements, each element having at least one first slide member or first channel and at least one second slide member or second channel, and the lateral surface of the first channel or the first slide member for the end portion of the driving shaft and the lateral surface of the second channel or the second slide member for the end portion of the driven shaft are each made of metal while the lateral surface of the first slide member or the first channel and the lateral surface of the second slide member or the second channel of each element of the torque transmitting member are each made of plastic material.

According to the present invention there is also an embodiment in which the above-described first and second directions intersect at a right angle with each other.

In addition, according to the present invention, there is provided a method of manufacturing a torque transmitting member for a shaft coupling in which, on both surfaces of the above-described reinforcing plate, the first slide member or the first channel and the second slide member or the second channel, which are made of plastic material, are formed, or for a shaft coupling in which, at least the lateral surface of the first slide member or the first channel and the lateral surface of the second slide member or the second channel of the metallic base member are coated with plastic material, characterized in that a molding process with the plastic material is carried out by using the reinforcing plate or the metallic base member as the insert.

BRIEF DESCRIPTION OF THE DRAWINGS

FIG. 14 is a perspective view of an element of the torque transmitting member according to the fourth embodiment;

FIG. 15 is an exploded perspective view illustrating a modified example of the fourth embodiment;

BEST MODE FOR CARRYING OUT THE INVENTION

A plurality of concrete embodiments of the present invention will be hereinafter described with specific reference to the accompanying drawings.

Figure 1:
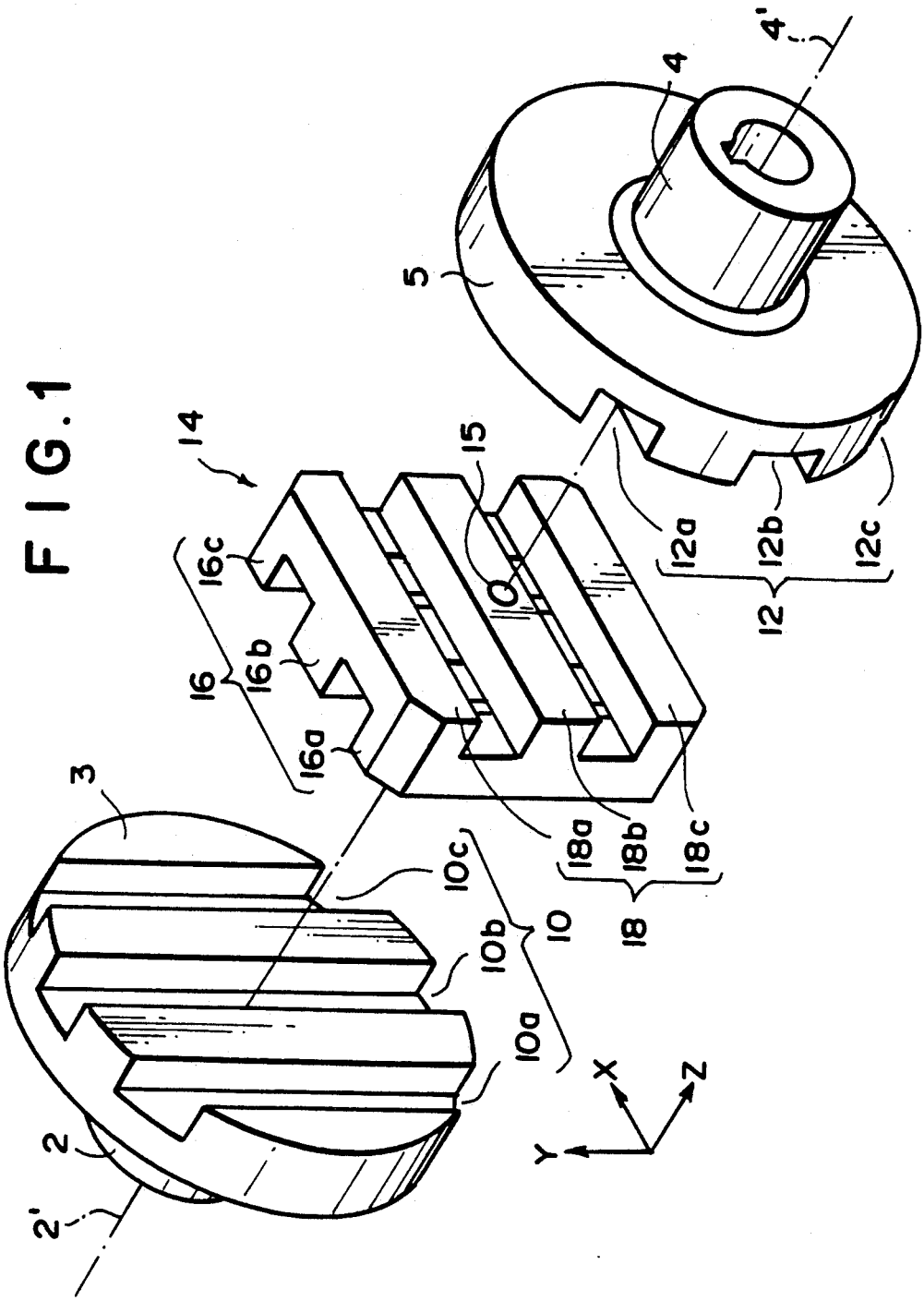
FIG. 1 is an exploded perspective view illustrating a first embodiment of a shaft coupling according to the present invention.
Figure 2:
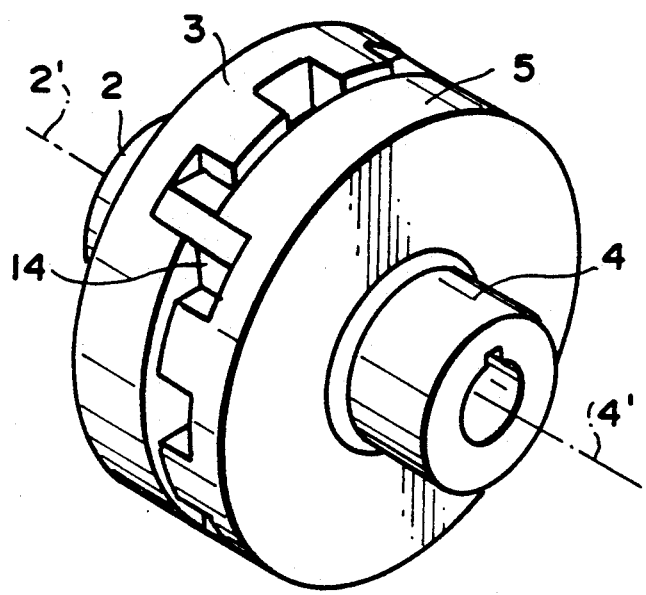
FIG. 2 is a perspective view illustrating how it is assembled.
Figure 3:
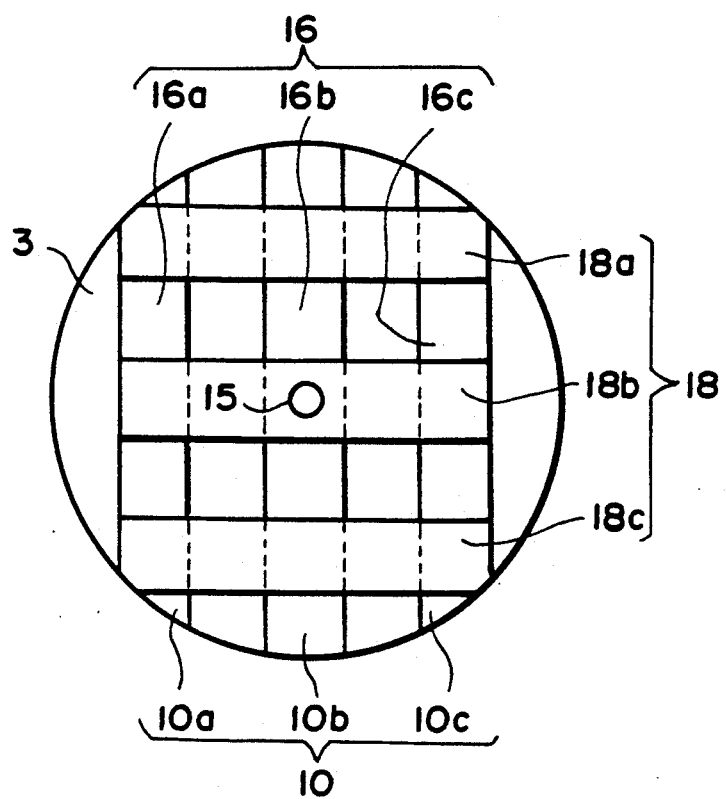
FIG. 3 is a frontal view thereof part of which is omitted.
Figure 4:
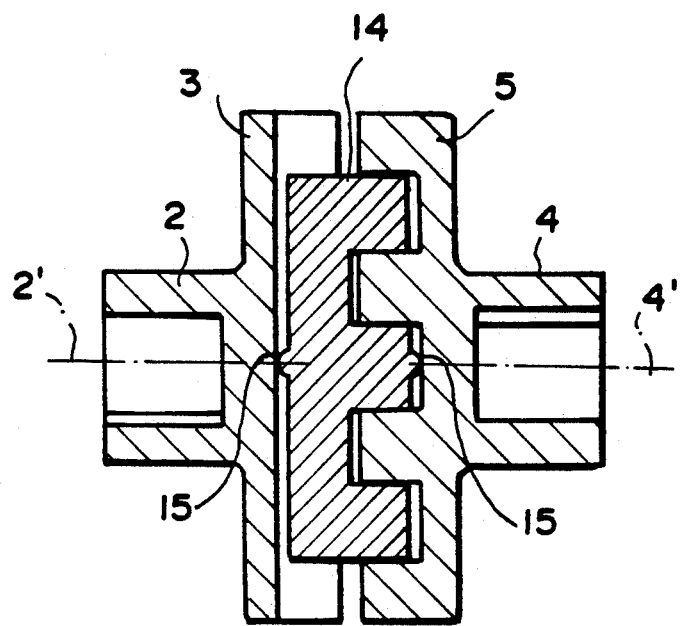
FIG. 4 is a longitudinal cross-sectional view of its central portion.

FIG. 1 is an exploded perspective view illustrating a first embodiment of a shaft coupling according to the present invention, FIG. 2 is a perspective view illustrating how it is assembled, FIG. 3 is a frontal view thereof part of which is omitted and FIG. 4 is a longitudinal cross-sectional view of the central portion thereof.

Referring to these figures, reference numeral 2 denotes the end portion of a driving shaft, 2' a rotational axis of a driving shaft and 3 denotes a flange portion formed at the top end of the end portion of the driving shaft. In addition, reference numeral 4 denotes the end portion of a driven shaft, 4' a rotational axis of the driven shaft and 5 denotes a flange portion formed at the top end of the end portion of the driven shaft. The end portion 2 of the driving shaft and the end portion 4 of the driven shaft are each disposed so that the flange portions 3 and 5 are opposed to each other and the rotational axes 2' and 4' align with each other in the direction of Z.

The end surface of the flange portion 3 at the end portion of the driving shaft, which faces the flange portion 5 at the end portion of the driven shaft, forms a plane (X-Y plane) which intersects at a right angle with the rotational axis 2' of the driving shaft. Similarly, the end surface of the flange portion 5 at the end portion of the driven shaft, which faces the flange portion 3 at the end portion of the driving shaft, forms a plane (X-Y plane) which intersects at a right angle with the rotational axis 4' of the driven shaft. These flange portions 3 and 5 are made of metal, for example, steel.

On the flange portion 3 at the end portion of the driving shaft, three first channels 10a, 10b and 10c are each formed in the direction of Y which intersect at a right angle with the above-described direction Z. Likewise, on the flange portion 5 at the end portion of the driven shaft, three second channels 12a, 12b and 12c are each formed in the direction of X which intersect at a right angle with both Z and Y directions. The shape of the cross section of these channels are each of rectangular form.

A torque transmitting member 14 is disposed between the flange portions 3 and 5. The transmitting member 14 is formed by joining three first slide members 16a, 16b and 16c and three second slide members 18a, 18b and 18c. The slide members 16a, 16b and 16c are each fitted into the channels 10a, 10b and 10c of the flange portion 3 at the end portion of the driving shaft so that they may be moved in the directions of Y and Z within these channels. Similarly, the slide members 18a, 18b and 18c are each fitted into the channels 12a, 12b and 12c of the flange portion 5 at the end portion of the driven shaft so that they may be moved in the directions of X and Z within these channels.

However, a protrusion 15 is formed on the slide members 16b and 18b so that they each abut on the bottom portion of the channel 10b at the side of the driving shaft and the bottom portion of the channel 12b at the side of the driven shaft, to thereby set an interval between the end portion 2 of the driving shaft and the end portion 4 of the driven shaft with the result that a limit is provided for them to move in the direction of Z.

Incidentally, according to this embodiment, the torque transmitting member 14 is integrally formed of plastic material. As the plastic material, a synthetic resin which has a proper slipping property relative to the metallic material of the flange portions 3 and 5, a proper stiffness and, further, a proper flexibility, for example, a polyacetal resin or a polyamide resin may be used. In addition, the plastic material of the transmitting member 14 exhibits self-lubricating properties, and may continuously lubricate especially when being in contact with the lateral surface of the channel 10 of the flange portion 3 and the lateral surface of the channel 12 of the flange portion 5. The transmitting member 14 may be produced by, for example, machining a block of the plastic material.

In this embodiment, when the end portion 2 of the driving shaft is rotated, its torque is transmitted via the slide members 16a through 16c and the slide members 18a through 18c of the transmitting member 14 to rotate the end portion 4 of the driven shaft. At this time, a certain deformation is allowed for the slide members 16a through 16c and 18a through 18c of the transmitting member 14.

If the rotational axis 2' of the driving shaft and the rotational axis 4' of the driven shaft becomes eccentric, then it can be successfully coped with by mainly a sliding motion of the slide members 16a through 16c within the channels 10a through 10c and a sliding motion of the slide members 18a through 18c within the channels 12a through 12c.

In addition, if the rotational axis 2' of the driving shaft and the rotational axis 4' of the driven shaft deviate in angle, then it can be successfully coped with by mainly the sliding and rocking motions (the ununiform movement in the direction of the rotational axis 2' of the driving shaft, that is, the rotational movement with the X direction as its axis) of the slide members 16a through 16c within the channels 10a through 10c and the sliding and rocking motions (the ununiform movement in the direction of the rotational axis 4' of the driven shaft, that is, the rotation with the Y direction as its axis) of the slide members 18a through 18c within the channels 12a through 12c.

Further, when the end portion 2 of the driving shaft and the end portion 4 of the driven shaft are relatively moved axially, it can be successfully coped with by a parallel movement of the slide members 16a through 16c in the direction of Z within the channels 10a through 10c and a parallel movement of the slide members 18a through 18c in the direction of Z within the channels 12a through 12c.

Actually, the above-described eccentricity, deviation of angle and axial movement can be generated in combination and, therefore, a combination of these actions is carried out. In this embodiment, since the torque transmitting member 14 is somewhat flexible, a slight deformation can be generated to Incidentally, since the magnitude of the above-described eccentricity, deviation of angle and axial movement is substantially restricted to a certain range, it cannot happen that, by the above-described actions, the slide members 16a through 16c and the slide members 18a through 18c of the transmitting member 14 is released from the channels 10 and 12 or each portion of the transmitting member 14 is deformed by exceeding a permissible range.

As described above, according to this embodiment, three kinds of deformations and displacements such as a slight deformation of the transmitting member 14, the movement of the slide members 16a through 16b within the channels 10a through 10c and the movement of the slide members 18a through 18c within the channels 12a through 12c are simultaneously achieved and, as a result, a deformation and a displacement of desired magnitude can be achieved on the whole even if each of them is small, so that the transmission of the torque can be especially excellently achieved during the transition period when the equilibrium state is being changed. In addition, in this embodiment, since the transmitting member 14 made of synthetic resin is used, the effect of damping the vibration and suppressing its transmission is also excellent.

The shaft coupling according to the embodiment as above can be readily produced by assembling the construction members as shown in FIG. 1.

Since this embodiment is not only based on the deformation of the flexible member as being different from the conventional flexible coupling, the loss of energy is small and the effect of transmitting the torque is excellent.

In addition, since the torque transmitting member 14 has a plurality of first and second slide members respectively so that they may transmit the torque by contacting the first and second channels over a large area, a large torque can be transmitted. That is, while the conventional Oldham coupling corresponds to a case of this embodiment in which the number of the first slide member is one (only 16b) and the number of the second slide member is one (only 18b), in this embodiment shown in the drawings, since the numbers of the first slide member and the second slide member are each three, a great torque can be transmitted when the outer diameter of the coupling is the same as compared with that of conventional type.

In addition, in this embodiment, since the transmitting member 14 has a proper flexibility, transmission of the vibration between the driving shaft side and the driven shaft side can be suppressed while, at the same time, transmission of the torque can be smoothly changed as the load is abruptly changed or the like.

In addition, according to this embodiment, since the transmitting member 14 displays self-lubricating properties when sliding on the flange portion 3 at the end portion of the driving shaft and the flange portion 5 at the end portion of the driven shaft, it is not necessary to use a lubricating oil, which eases a maintenance.

Figure 5:
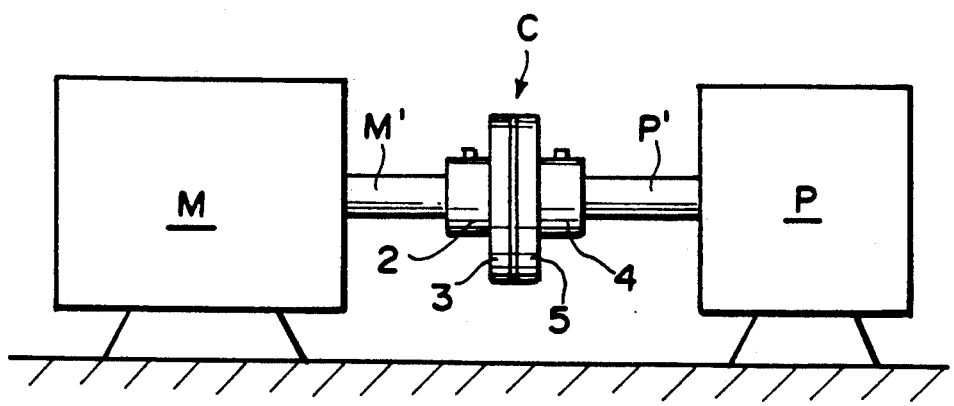
FIG. 5 is a schematic explanatory view illustrating an example embodying the shaft coupling of the invention.

FIG. 5 is a schematic explanatory view illustrating an embodiment in which the shaft coupling according to the present invention is used. The end portion 2 of the driving shaft for the shaft coupling C according to the present invention is mounted to an output rotating shaft M' of a motor M (the shaft M' corresponds to the driving shaft), and the end portion 4 of the driven shaft for the shaft coupling C is mounted to an input rotating shaft P' of a pump P, which is the driven apparatus (the shaft P' corresponds to the driven shaft).

When the shaft coupling C is mounted, the motor M is set and fixed, and the end portion 2 of the driving shaft of the shaft coupling C is connected and fixed to the output shaft M' of the motor so that, as shown in FIG. 4, a protrusion 15 at both sides of the transmitting member 14 abuts on the bottom portion of the channel of the flange portion 3 at the end portion of the driving shaft while abutting on the bottom portion of the channel of the flange portion 5 at the end portion of the driven shaft. Then, the pump P is gradually moved toward the shaft coupling C to join and fix the input shaft P' of the pump to the end portion 4 of the driven shaft of the shaft coupling C. Incidentally, at this time, it is not necessary to strictly carry out removal of the eccentricity, removal of the deviation in angle and adjustment of the axial direction between the driving shaft and the driven shaft.

Figure 6:
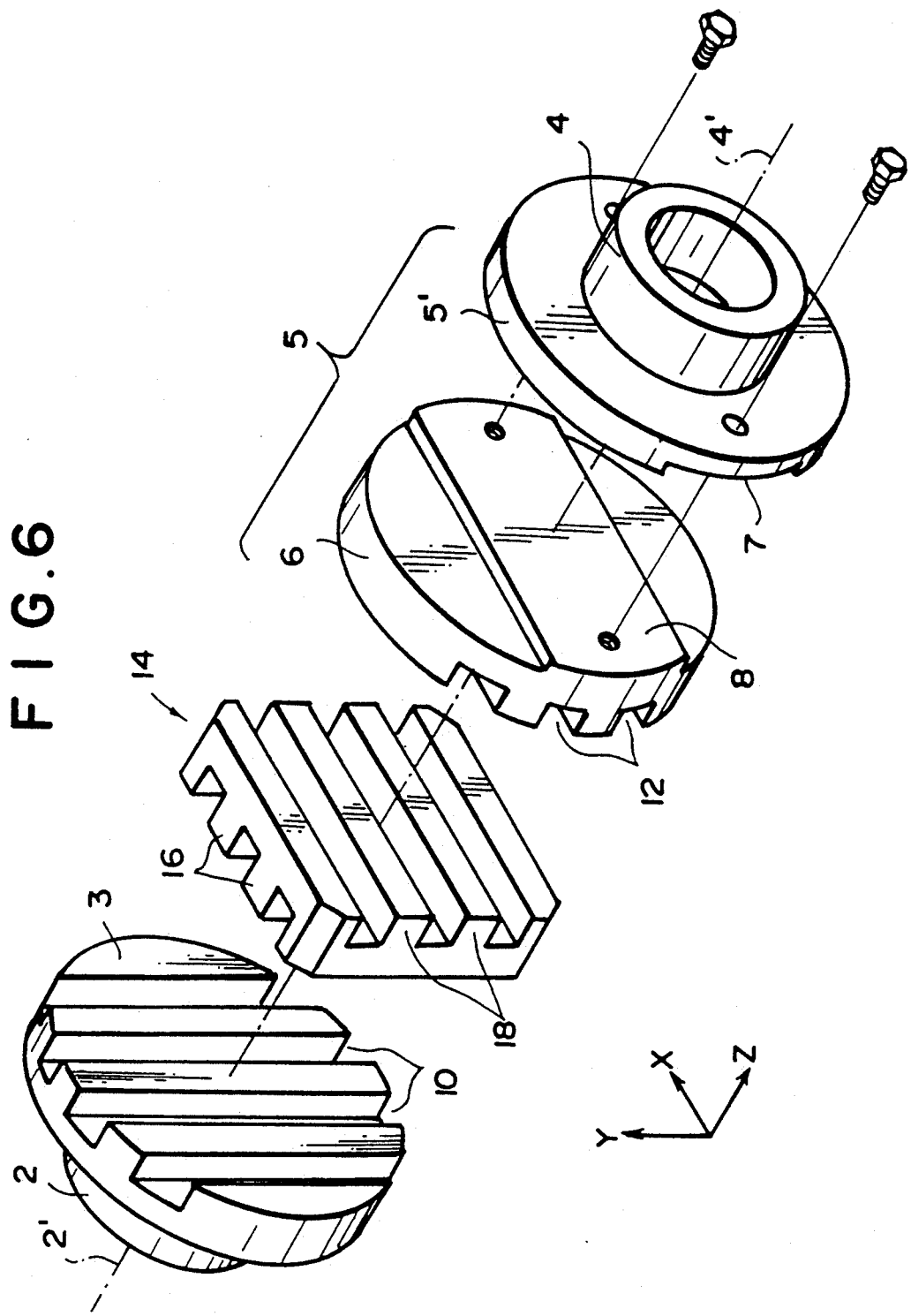
FIG. 6 is an exploded perspective view illustrating a second embodiment of the shaft coupling according to the present invention.
Figure 7:
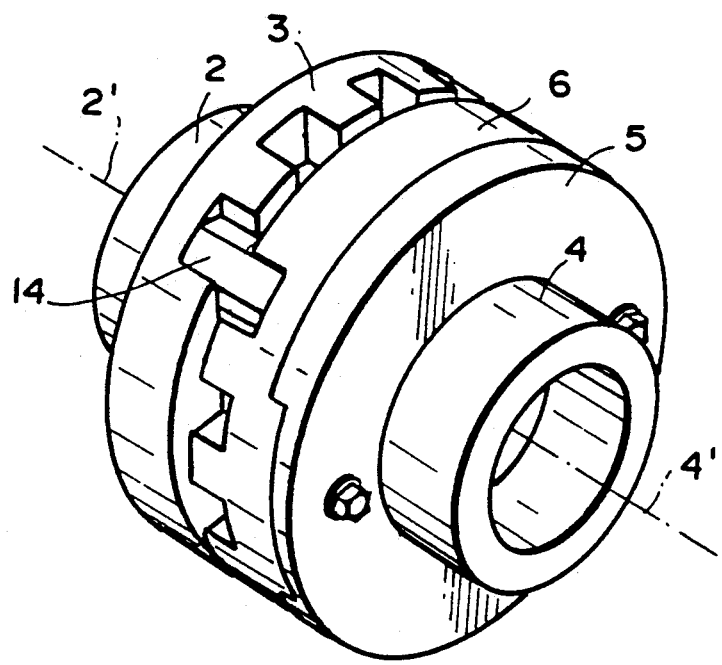
FIGS. 7 and 8 are respectively a perspective view and a lateral cross-sectional view of the second embodiment illustrating how it is assembled.
Figure 8:
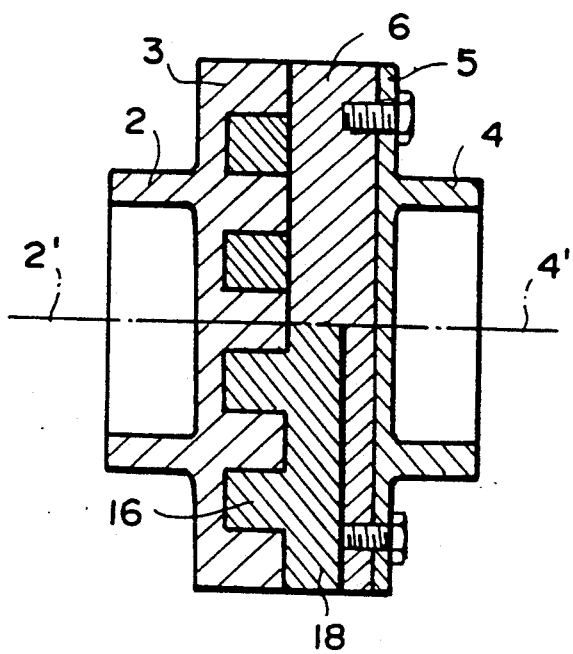

FIG. 6 is an exploded perspective view illustrating a second embodiment of the shaft coupling according to the present invention, and FIGS. 7 and 8 are respectively a perspective view and a lateral cross-sectional view illustrating how it is assembled. In these figures, like signs are assigned to the members having a function similar to that of the above-described embodiment.

In this embodiment, the flange portion 5 at the end portion of the driven shaft comprises a proximal portion 5' and a plate-shaped fitting member 6. The fitting member 6 is mounted to the proximal portion 5' by means of a screw. An engaging channel 7 is formed in the direction of X on the proximal portion 5', and an engaging protrusion 8 of a shape corresponding to the engaging channel is formed in the direction of X on the above-described fitting member 6. These engaging channel 7 and protrusion 8 each serve as a means for preventing the relative rotation. That is, the relative rotation of the fitting member 6 and the proximal portion 5' about the rotational axis 4' of the driven shaft is blocked not only by means of the screw, but substantially by engagement of the engaging channel 7 and the engaging protrusion 8.

And, on the surface of the fitting member 6 at the side facing the flange portion 3 at the end portion of the driving shaft, a plurality of second channels 12 are formed in the direction of X, the cross section of which is of rectangular form. The torque transmitting member 14 is disposed between the flange portion 3 at the end portion of the driving shaft and the flange portion 5 at the end portion of the driven shaft. The transmitting member has a plurality of first slide members 16 at the side facing the driving shaft, which are each fitted to the plurality of first channels 10, while having a plurality of second slide members 18 at the side facing the driven shaft, which are each fitted to the plurality of second channels 12.

Thus, also according to the present invention, a function similar to that of the first embodiment can be achieved.

The entire shaft coupling and part of the construction members therefor according to this embodiment can be readily mounted to and removed from a mechanism for transmitting the torque. That is, for example, when they are repaired, by removing the screw, the fitting member 6 can be relatively moved in the direction of X relative to the proximal portion 5' of the flange portion 5 at the end portion of the driven shaft. In addition, since the fitting member 6 can be relatively moved in the direction of X relative to the transmitting member 14, after all, the fitting member 6 can be withdrawn by moving in the direction of X. The transmitting member 14 can be withdrawn by moving in the direction of Y relative to the flange portion 3 at the end portion of the driving shaft. Thus, by utilizing a space formed in the center, the end portion 2 of the driving shaft and the end portion 4 of the driven shaft 4 can be each further removed.

Therefore, according to this embodiment, by removing the worn parts to be replaced, as described above, and mounting new parts in that place in accordance with the opposite procedure as the above-described one, it is promptly repaired without moving at all both of the apparatus at the side of the driving shaft and the apparatus at the side of the driven shaft, which are each connected by the shaft coupling, which may extremely shorten the shut-down time. The process in the initial installation and the final removal of the shaft coupling is completely the same as its repairing.

Figure 9:
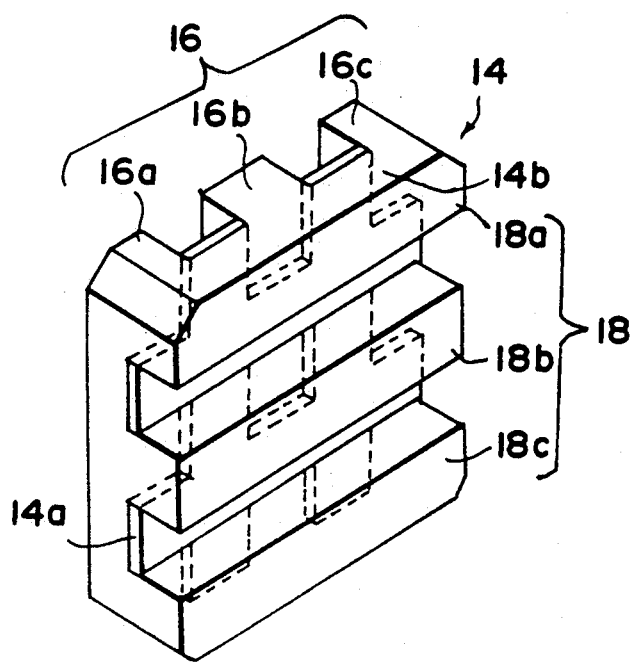
FIG. 9 is a perspective view illustrating a modified embodiment of a torque transmitting member according to the first embodiment.

FIG. 9 is a perspective view illustrating a modified embodiment of the torque transmitting member according to the above-described first embodiment. In this embodiment, the torque transmitting member 14 comprises a reinforcing plate 14a and a plastic material portion 14b. The plastic material portion 14b has a plurality of first slide members 16 at the side facing the driving shaft, each having a lateral surface fitting to the lateral surface of the plurality of first channels 10 while having a plurality of second slide members 18 at the side facing the driven shaft, each having a lateral surface fitting to the lateral surface of the plurality of second channels 12. As the plastic material portion 14b, the same material as the plastic material for the transmitting member 14 according to the first embodiment can be used.

Thus, also in this embodiment, a function similar to that of the first embodiment can be achieved.

In addition, according to this embodiment, since the reinforcing plate 14a is used, the strength of the transmitting member 14 is improved, so that a great torque can be transmitted resulting in an elongated service life.

Figure 10:
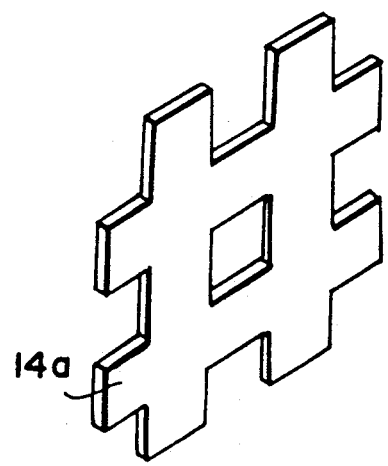
FIG. 10 is a perspective view of a reinforcing plate of the torque transmitting member.

The torque transmitting member 14 according to this embodiment can be made by insert molding. That is, a reinforcing plate 14a made of metal, for example, a stainless steel, as shown in FIG. 10, is used as the insert and this is set into a mold of desired shape to pour a synthetic resin, for example, a polyacetal resin. As a result, as shown in FIG. 9, a torque transmitting member 14 can be achieved in which the first slide members 16a through 16c and the second slide members 18a through 18c, which are each the plastic material portion 14b, are formed at both surfaces of the reinforcing plate 14a. As shown, the reinforcing plate 14a takes the form of parallel crosses, which allows the plastic material, when poured, to flow through the notched portion or the central aperture portion of the reinforcing plate 14a, via which two parts of the plastic material portion 14b on both surfaces are connected to each other. As described above, by the insert molding, a change of the shape of the first and second slide members, which is caused by shrinkage of the plastic material after molded, can be remarkably reduced to allow a mass production with excellent efficiency to achieve a reduction of the cost. In contrast, if the transmitting member is otherwise molded without using the reinforcing plate, then the deformation caused by the shrinkage becomes large, which cannot assure an excellent article.

Figure 11:
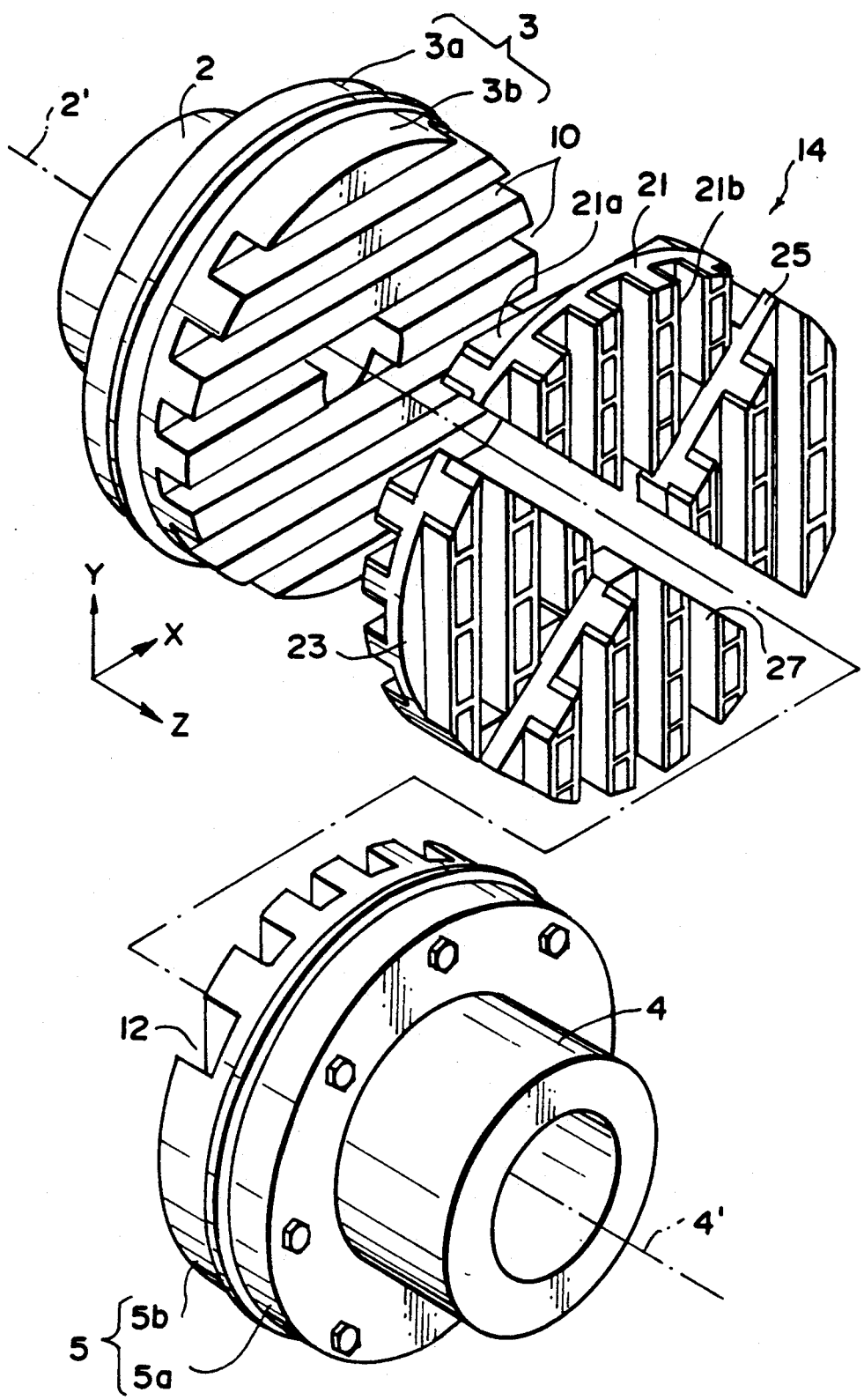
FIG. 11 is an exploded perspective view illustrating a third embodiment of the shaft coupling according to the present invention.

FIG. 11 is an exploded perspective view illustrating a third embodiment of the shaft coupling according to the present invention, in which like signs are assigned to the members having a function similar to that of the above-described embodiments.

In this embodiment, the flange portion 3 at the end portion of the driving shaft is achieved by removably mounting a disc-shaped member 3b to the proximal portion 3a by means of a screw, and the flange portion 5 at the end portion of the driven shaft is achieved by removably mounting a disc-shaped member 5b to the proximal portion 5a by means of a screw. And, six first channels 10 are formed in the direction of X on the disc-shaped member 3b, and six second channels 12 are formed in the direction of Y on the disc-shaped member 5b.

The torque transmitting member 14 is disposed between the flange portion 3 at the end portion of the driving shaft and the flange portion 5 at the end portion of the driven shaft. The transmitting member 14 is divided into four uniformly sized portions 21, 23, 25 and 27. These portions each assume a form in which a disc-shaped member of size similar to that of the end portions 3 and 5 of the driving shaft and the driven shaft respectively is divided into four portions. The directions of their diving lines are inclined by an angle of 45 degrees in the directions of X and Y. A portion 21 of the transmitting member has first slide members 21a at the side facing the driving shaft which each fit to the first channel 10 while having second slide members 21b at the side facing the driven shaft which each fit to the second channel 12. Likewise, portions 23, 25 and 27 of the transmitting member has first slide members at the side facing the driving shaft which each fit to the first channel 10 while having second slide members at the side facing the driven shaft which each fit to the second channel 12.

In consequence, the portions 21, 23, 25 and 27 of the transmitting member can be each moved relative to the end portion of the driving shaft as the first slide member is slidingly moved within the first channel 10 at the end portion of the driving shaft while they can be each moved relative to the end portion of the driven shaft as the second slide member is slidingly moved within the second channel 12 at the end portion of the driven shaft.

Figure 12:
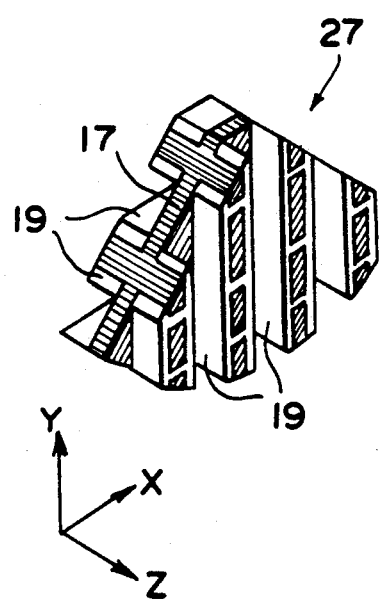
FIG. 12 is a perspective view of a portion of the torque transmitting member.

FIG. 12 illustrates the portion 27 of the transmitting member. This portion 27 is achieved by applying a coating 19 made of plastic material to a metallic base member 17, that is, the coating made of the plastic material is applied to a portion where its first slide member and second slide member each contact with the first and second channels 10 and 12. Here, the first slide member at the side facing the driving shaft runs in the direction of X, and the second slide member at the side facing the driven shaft runs in the direction of Y. In this embodiment, the same ones may be used as the portions 21, 23, 25 and 27. That is, the portion 21 corresponds to the portion 27 disposed at a symmetrical position relative to the direction of Z and, further, the other two portions 23 and 25 each correspond to the portion 27 disposed at a predetermined position by inverting relative to the direction of Z. Thus, according to this embodiment, only one kind may be made as the portion for transmitting member, which allows the number of kinds of parts to be reduced.

As the plastic material used for the above-described coating, the same materials as the plastic material of the transmitting member 14 for the first embodiment may be used.

The shaft coupling as described above can be readily made by accommodating the metallic base member 17 into the mold as the insert to mold integrally with the plastic material by injection (insert molding) to apply with the coating 19, and by assembling the resulting portions 21, 23, 25 and 27 of the transmitting member together with other construction members shown in FIG. 11. In addition, it can be readily made by preparing the portions of the transmitting member which are joined in advance, and by diving it into four.

In this embodiment, when the end portion 2 of the driving shaft is rotated, its torque is transmitted to the second channel 12 of the flange portion 5 at the end portion of the driven shaft from the first channel 10 of the flange portion 3 at the end portion of the driving shaft via the four portions 21, 23, 25 and 27 of the torque transmitting member to rotate the end portion 4 of the driven shaft. If the eccentricity, deviation of angle and axial movement are generated between the end portion 2 of the driving shaft and the end portion 4 of the driven shaft, as in the above-described embodiments, it can be successfully coped with by the relative movement between the portions 21, 23, 25 and 27 of the transmitting member and the end portion of the driving shaft and the relative movement between these portions of the transmitting member and the end portion of the driven shaft.

Thus, also in this embodiment, a function similar to that of the above-described first embodiment can be achieved.

Further, in this embodiment, since the transmitting member 14 has the metallic base member 17, a sufficient strength can be obtained so that a great torque may be transmitted.

In this embodiment, since the transmitting member is divided into a plurality of portions, a difference in expansion and shrinkage between the base member and the coating, which is caused by the fluctuating temperature, is small for each portion during usage with the result that their distortion is small and a danger of failure is also small.

In addition, the entire shaft coupling or part of the construction member of the shaft coupling can be readily mounted to and removed from the mechanism for transmitting the torque. That is, for example, when it is to be repaired, by removing the screw, the disc-shaped members 3b and 5b can be withdrawn by moving relative to the proximal portion 3a of the flange portion at the end portion of the driving shaft and the proximal portion 5a of the flange portion at the end portion of the driven shaft in the directions of X and Y respectively. In consequence, either one of the disc-shaped members 3b and 5b is removed like this and, thereafter, the transmitting member can be withdrawn by moving in the direction of Y or X and, further, the proximal portion 3a or 5a at one of the disc-shaped members 3b and 5b and the proximal portion 5a or 3a at the other of the disc-shaped members 3b and 5b can be removed.

Therefore, according to this embodiment, as described above, by removing the worn members to be replaced and mounting the new members in accordance with the procedure opposite to the above-described removing procedure, the repairing can be promptly carried out without moving the apparatus at the driving and driven sides, which are coupled by the shaft coupling, which may extremely shorten the shut-down time. Completely the same is also true of the initial mounting and the final removal of the shaft coupling other than when it is repaired.

According to this embodiment, when the load applied to the driven shaft side is relatively large, since, by using all of the four portions 21, 23, 25 and 27, a surface on which the torque is transmitted can be sufficiently widely secured, the torque can be excellently transmitted. And, when the load applied to the driven shaft side is relatively small, by using only two (for example, 21 and 27, or 23 and 25) of the portions 21, 23, 25 and 27, which each lie in the opposed positional relationship, the other two are removed to reduce the weight of the transmitting member and, hence, reduce the torque at the side of the driving shaft to increase the efficiency of energy.

Incidentally, although, in this embodiment, the direction in which the dividing line of the transmitting member is offset by an angle of 45 degrees relative to the direction in which the first and second slide members run, it is also possible to align it with the directions in which the first and second slide members run. In addition, the number of the portions of the transmitting member is not necessarily restricted to rour, but may be any even number more than that. Removing of part of the portions of the uniformity around the member is preferably conducted taking the load on the driven shaft side into account, so that the uniformity around the rotational axis may be maintained as much as possible.

Figure 13:
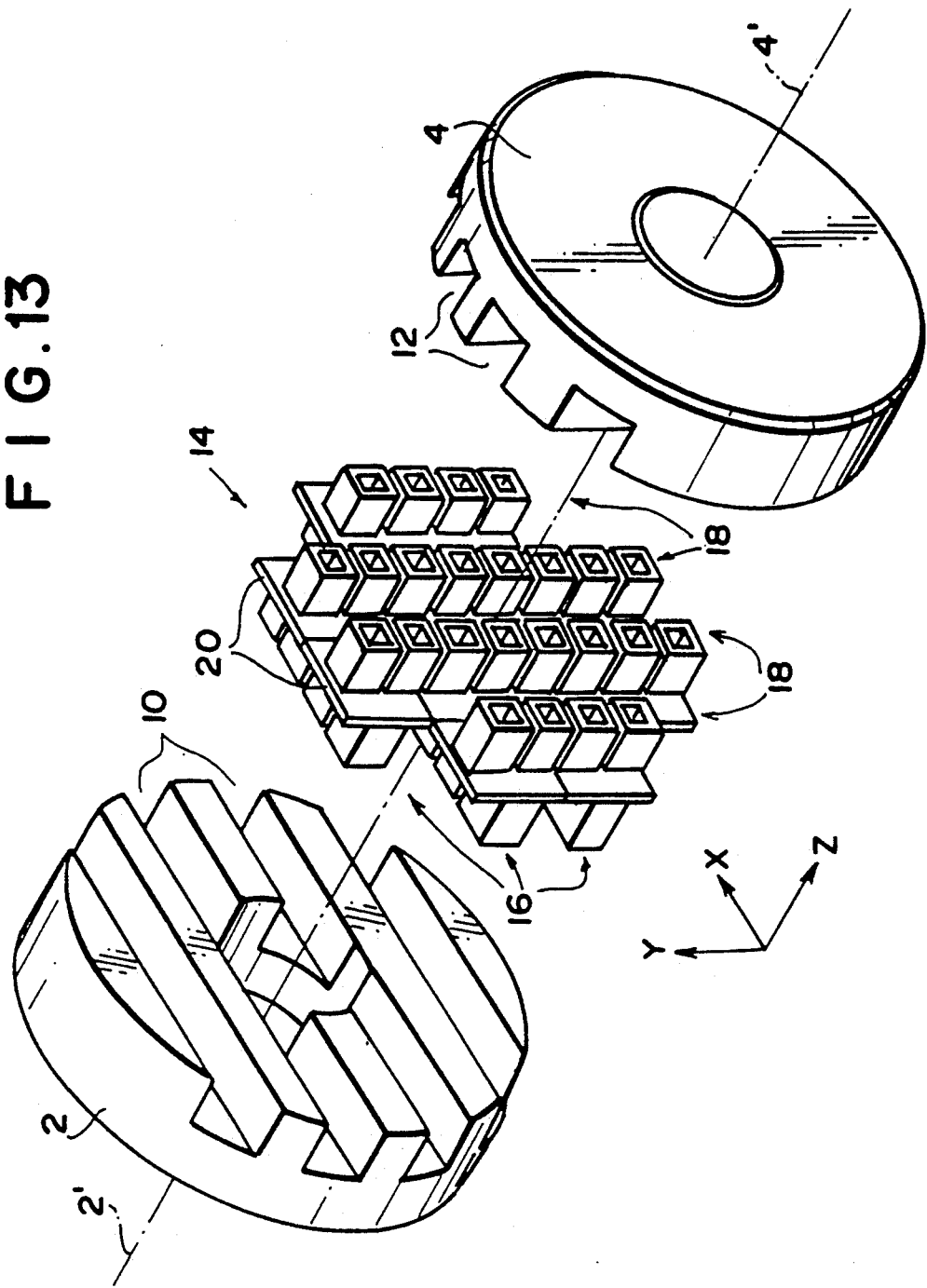
FIG. 13 is an exploded perspective view illustrating a fourth embodiment of the shaft coupling according to the present invention.

FIG. 13 is an exploded perspective view illustrating a fourth embodiment of the shaft coupling according to the present invention. In the same figure, like signs are each assigned to the members having a function similar to that of the above-described embodiments.

In this embodiment, the transmitting member 14 is made of a plurality of plastic elements 20. The element 20 is achieved by forming two hollow protrusions 20b on one surface of a base plate 20a within a plane X-Y and two hollow protrusions 20c on the other surface thereof, as shown in FIG. 14. As shown, two protrusions 20b at the side facing the driving shaft are disposed in the direction of X to form a first slide member 16, and two protrusions 20c at the side facing the driven shaft are disposed in the direction of Y to form a second slide member 18.

As shown in FIG. 13, for the transmitting member 14, twelve elements 20 are arrayed at predetermined positions side by side so that the base plates 20a lie on the same plane. By the protrusions 20b of all the elements 20, a plurality of first slide members 16 is formed each having a lateral surface fitting with the lateral surface of a plurality of first channels 10 at the end portion 2 of the driving shaft. Similarly, by the protrusions 20c of all the elements 20, a plurality of second slide members 18 is formed each having a lateral surface fitting with the lateral surface of a plurality of second channels 12 at the end portion 4 of the driven shaft.

As the plastic material for each element of the transmitting member 14, the same material as the transmitting member 14 according to the first embodiment may be used.

Also in this embodiment, a function similar to that of the first embodiment can be achieved.

Further, in this embodiment, since the transmitting member 14 formed with a multiplicity of elements 20 of the same shape, by replacing only the worn elements as necessary, it is possible to readily repair the transmitting member 14. In addition, the number of used elements can be increased or decreased according to the magnitude of the torque to be transmitted. For example, if ones of large diameter are used for the end portions at the driving and driven shafts, then, correspondingly, a transmitting member of large diameter can be achieved by using further more elements than one shown in FIG. 13.

Figure 16:
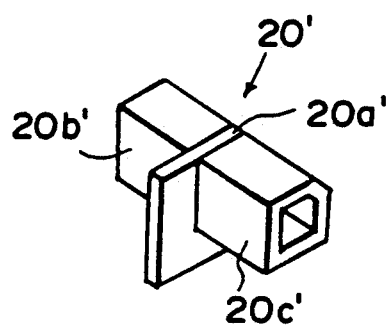
FIG. 16 is a perspective view of an element of the torque transmitting member according to the modified embodiment.

FIG. 15 is an exploded perspective view illustrating a modified example of this embodiment. In the same figure, like signs are each assigned to the members similar to those of FIG. 13. In this example, the torque transmitting member 14 is constituted by also using elements 20' at four corners other than the above-described elements 20. The elements 20' are each achieved by each forming a single hollow protrusion 20b' and 20c' on both surfaces, as shown in FIG. 16. As shown in FIG. 15, the first slide member 16 is formed by including the protrusions 20b' and 20b, and the second slide member 18 is formed by including the protrusions 20c' and 20c. According to this modified embodiment, since the torque is transmitted by using the four corners, which are extremely effective for transmitting the torque, the transmission efficiency can be further improved.

Figure 17:
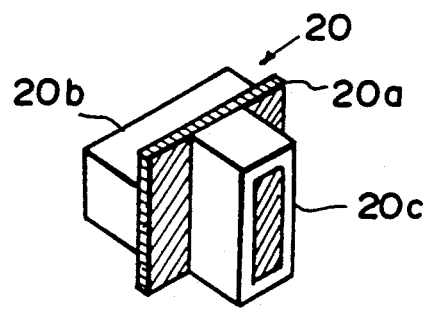
FIGS. 17 and 18 are respectively a perspective view illustrating a modified embodiment of the element of the torque transmitting member.
Figure 18:
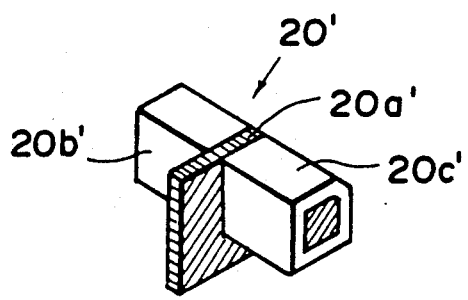

FIGS. 17 and 18 each illustrate a modified embodiment of the elements 20 and 20' of the transmitting member. According to these modified embodiments, the base plates 20a and 20a' are each made of metal, for example, aluminum, and the protrusions 20b, 20c, 20b' and 20c' are each achieved by coating plastic material to the lateral surface of the protrusion integral with the metallic material of the base plates 20a and 20a'. In consequence, the strength of the elements 20 and 20' is sufficiently increased. As shown in FIG. 17, at each side of the element 20, a single protrusion is formed.

Although, in the foregoing embodiments, the plastic material is used at the side of the transmitting member, the present invention may also include ones using the plastic material at the end portions of the driving shaft and the driven shaft. Next, such embodiments are described.

Figure 19:
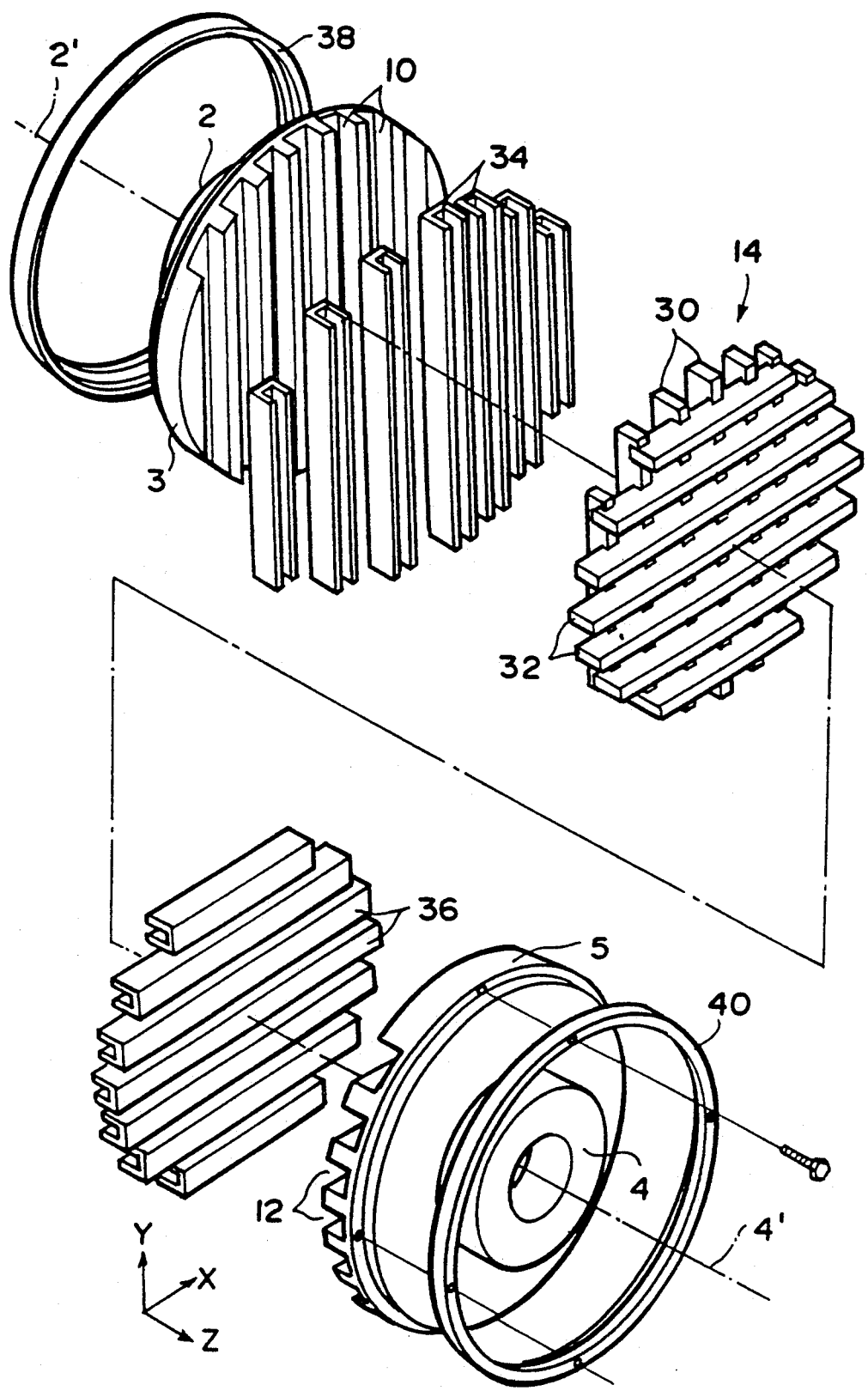
FIG. 19 is an exploded perspective view illustrating a fifth embodiment of the shaft coupling according to the present invention.
Figure 20:
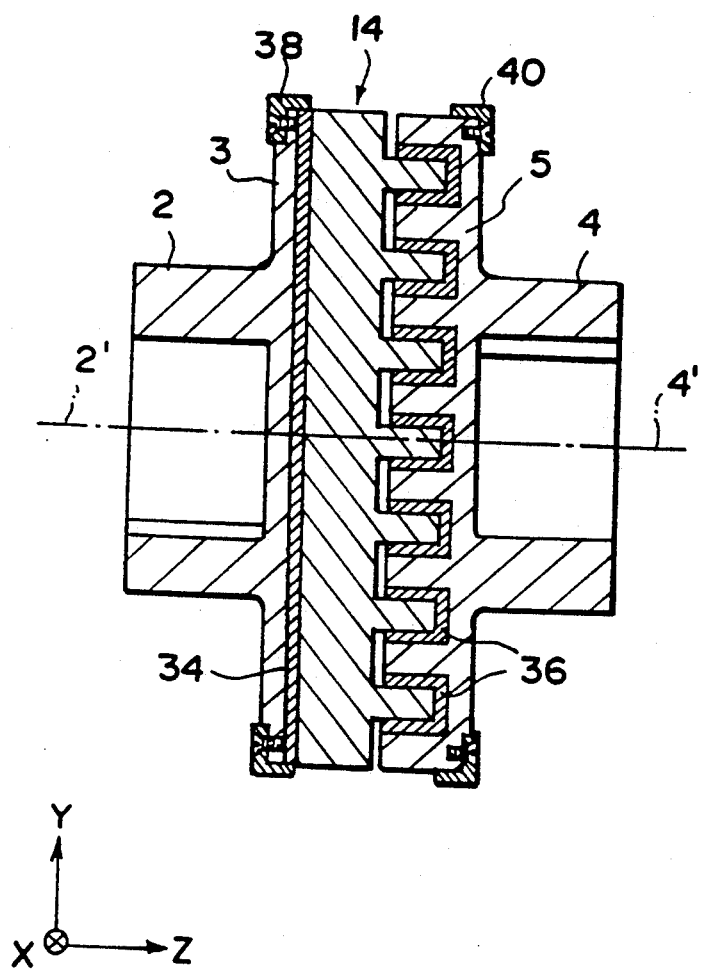
FIG. 20 is a longitudinal cross-sectional view illustrating how the fifth embodiment is assembled.

FIG. 19 is an exploded perspective view illustrating a fifth embodiment, and FIG. 20 is a longitudinal cross-sectional view illustrating how it is assembled. In these figures, like signs are assigned to the members having a function similar to that of the foregoing embodiments.

The torque transmitting member 14 is disposed between the end portion 2 of the driving shaft and the end portion 4 of the driven shaft. The transmitting member has a plurality of first slide members 30 each fitting with a plurality of first channels 10 at the driving shaft side and a plurality of second slide members 32 each fitting with a plurality of second channels 12 at the driven shaft side. However, a first damping slide member 34 (of substantially the same length as that of the first channel 10) made of plastic material is interposed between the first channel 10 and the first slide member 30, and a second damping slide member 36 (of substantially the same length as that of the second channel 12) made of plastic material is interposed between the second channel 12 and the second slide member 32, in order to damp the vibrations and smooth the sliding during the transmission of the torque. As the plastic material for these damping slide members, the same material as the plastic material for the transmitting member 14 according to the first embodiment may be used. In addition, the damping slide member is of U-shape in cross section. Incidentally, as the damping slide members 34 and 36, ones divided into a plurality of blocks may be used by disposing in the longitudinal direction.

A ring 38 is removably mounted about the outer circumference of the flange portion 3 so that the inner surface of the ring may engage part of the end surface of the first damping slide member 34 to block movement of the first damping slide member in the direction of Y. Similarly, a ring 40 is removably mounted about the outer circumference of the flange portion 5 so that the inner surface of the ring may engage part of the end surface of the second damping slide member 36 to block movement of the second damping slide member in the direction of X. Incidentally, if the above-described damping slide member 34 is fixed within the channel 10 of the flange portion 3 and the damping slide member 36 is fixed within the channel 12 of the flange portion 5 (that is, the channels 10 and 12 are coated with the plastic material), the above-described rings 38 and 40 can be eliminated. Such a coating can be performed in a manner as described with reference to the above-described third embodiment.

Thus, for the transmitting member 14, the first slide member 30 may be moved within the first channel 10 at the driving shaft side in the directions of Y and Z via the first damping slide member 34 relative to the end portion of the driving shaft, and the second slide member 32 may be moved within the second channel 12 at the driven shaft side in the directions of X and Z via the second damping slide member 36 relative to the end portion of the driven shaft.

That is, a set of the end portion 2 of the driving shaft, first channel 10, first damping slide member 34 and the ring 38 and a set of the end portion 4 of the driven shaft, second channel 12, second damping slide member 36 and the ring 40 each have the same arrangement. If these are disposed by deviating by an angle of 90 degrees about the rotational axes 2' and 4', then an arrangement of FIG. 19 is obtained.

In this embodiment, when the end portion 2 of the driving shaft is rotated, its torque is transmitted to the transmitting member 14 from the flange portion 3 at the end portion of the driving shaft via the first damping slide member 34, which is accommodated within the first channel 10, and is further transmitted to the flange portion 5 at the end portion of the driven shaft via the second damping slide member 36, which is accommodated within the second channel 12 of the flange portion 5 at the end portion of the driven shaft to rotate the end portion 4 of the driven shaft. If the eccentricity, deviation of angle and axial movement occur between the end portion 2 of the driving shaft and the end portion 4 of the driven shaft, it can be successfully coped with by the relative movement of the transmitting member 14 and the end portion 2 of the driving shaft and the relative movement of the transmitting member 14 and the end portion 4 of the driven shaft. In addition, since the transmitting member is engaged to the end portions of the driving shaft and the driven shaft via the damping slide members 34 and 36, even if the torque is abruptly changed, generation of the vibrations is small, and wearing of the end portions of the driving and driven shafts and the transmitting member is substantially avoided.

Also in this embodiment, a function similar to that of the first embodiment can be achieved.

This embodiment is useful for increasing the size of the shaft coupling. That is, since the transmitting member 14 has a multiplicity of first and second slide members 30 and 32, and the torque can be transmitted over a large contact area, a great torque can be transmitted. In addition, if the length of each of the damping slide members 34 and 36 made of the plastic material is slightly shortened than that of the corresponding first channel 10 or second channel 12, even if the rise of the temperature causes a relative change of the size between the damping slide members and the flange portion 3 at the end portion of the driving shaft, the flange portion 5 at the end portion of the driven shaft or the transmitting member 14 due to the difference in their thermal expansion coefficient, since the damping slide members 34 and 36 can be relatively and freely extended in the longitudinal direction and since their relative change of the size in the lateral direction is small, the damping slide members 34 and 36 cannot be damaged and, further, the adverse effect on the transmission of the torque is extremely small.

The shaft coupling as described above can be readily made by assembling the construction members as illustrated in FIG. 19. In addition, the shaft coupling according to this embodiment can be simply repaired. That is, for example, by removing the rings 38 and 40, the first and second damping slide members 34 and 36 can be withdrawn by sliding. In such a manner, the worn slide members 34 and 36 can be replaced, as necessary, without moving the end portions of the driving and driven shafts. In consequence, the shut-down time of the apparatus taken for repairing can be extremely shortened.

Incidentally, although, in the above-described embodiments, the first channel is formed at the end portion of the driving shaft and the first slide member is formed on the transmitting member, according to the present invention, alternatively, the first slide member may be formed on the end portion of the driving shaft and the first channel may be formed at the transmitting member. Similarly, although, in the above-described embodiment, the second channel is formed at the end portion of the driven shaft and the second slide member is formed on the transmitting member, according to the present invention, alternatively, the second slide member may be formed on the end portion of the driven shaft and the second channel may be formed at the transmitting member.

Incidentally, the shaft coupling according to the present invention can be produced with a small diameter (on the order of, for example, 20 mm) through a large diameter (on the order of, for example, 600 mm).

INDUSTRIAL APPLICABILITY

As described above in greater detail, according to the present invention, a shaft coupling can be provided in which the eccentricity, deviation of angle and axial movement between the driving shaft side and the driven shaft side can be effectively tackled with, so that a great torque can be smoothly transmitted with a small loss, and its maintenance is simple.

I claim:
1. Shaft coupling in which:
   the end portion of a driving shaft and the end portion of a driven shaft are opposedly disposed and a torque transmitting member is interposed between said end portions of the driving shaft and the driven shaft;
   a plurality of first channels are each formed at said end portion of the driving shaft and extend in a first direction within a plane intersecting at a right angle with the rotational axis of the driving shaft, and a plurality of first slide members, which each fit with said first channels of the end portion of the driving shaft, are formed on said transmitting member;
   a plurality of second channels are each formed at said end portion of the driven shaft and extend in a second direction within a plane intersecting at a right angle with the rotational axis of the driven shaft, and a plurality of second slide members, which each fit with said second channels of the end portion of the driven shaft, are formed on said transmitting member;
   said torque transmitting member is integrally formed of plastic material and both a lateral surface of said first channel of the end portion of the driving shaft and a lateral surface of said second channel of the end portion of the driven shaft are made of metal; and
   said torque transmitting member comprises said first slide members and said second slide members connected one to the other so as to form at least one opening extending through said torque transmitting member and positioned between adjacent first slide members and between adjacent second slide members.

2. Shaft coupling as set forth in claim 1 wherein at least one of the end portion of the driving shaft and the end portion of the driven shaft includes a removable fitting member having said first channels or said second channels, the fitting member for the end portion of the driving shaft being mounted to the proximal portion of the end portion of the driving shaft in such a way that, when removed, it may be relatively moved in said first direction, and the fitting member for the end portion of the driven shaft being mounted to the proximal portion of the end portion of the driven shaft so that, when removed, it may be relatively moved in said second direction.

3. Shaft coupling as set forth in claim 2 wherein a means for preventing the relative rotation between said fitting member and said proximal portion about the rotational axis is provided at each of said end portions of the driving shaft and the driven shaft.

4. Shaft coupling as set forth in claim 1 wherein said first and second directions intersect at a right angle with each other.

* * * * *